United States Patent
Matsushita et al.

(10) Patent No.: US 9,899,148 B2
(45) Date of Patent: Feb. 20, 2018

(54) MANUFACTURING DEVICE FOR FIELD POLE MAGNET BODY AND MANUFACTURING METHOD FOR SAME

(71) Applicant: NISSAN MOTOR CO., LTD., Yokohama-shi, Kanagawa (JP)

(72) Inventors: Yasushi Matsushita, Yokohama (JP); Hideki Watanabe, Sagamihara (JP); Takashi Sekikawa, Yokohama (JP); Kimio Nishimura, Yokohama (JP); Kazuhiro Takaichi, Yokohama (JP); Akihisa Hori, Yokohama (JP); Takumi Ohshima, Yokohama (JP); Michito Kishi, Yokohama (JP); Kunitomo Ishiguro, Odawara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 903 days.

(21) Appl. No.: 14/363,943

(22) PCT Filed: Nov. 19, 2012

(86) PCT No.: PCT/JP2012/079913
§ 371 (c)(1),
(2) Date: Aug. 13, 2014

(87) PCT Pub. No.: WO2013/088911
PCT Pub. Date: Jun. 20, 2013

(65) Prior Publication Data
US 2015/0000114 A1     Jan. 1, 2015

(30) Foreign Application Priority Data
Dec. 14, 2011   (JP) ................... 2011-273222

(51) Int. Cl.
H01F 41/02 (2006.01)
H02K 15/03 (2006.01)
H02K 15/00 (2006.01)

(52) U.S. Cl.
CPC ......... H01F 41/0266 (2013.01); H02K 15/00 (2013.01); H02K 15/03 (2013.01); *Y10T 29/49075* (2015.01); *Y10T 29/5313* (2015.01)

(58) Field of Classification Search
CPC ... H01F 7/06; H01F 7/02; H01F 41/02; H01F 7/0221; H02K 15/00; H02K 15/03;
(Continued)

(56) References Cited

U.S. PATENT DOCUMENTS 5,518,562 A * 5/1996 Searle .................. B23K 20/129
156/580
5,687,471 A * 11/1997 Noguchi ................ H02K 15/03
29/512

(Continued)

FOREIGN PATENT DOCUMENTS

JP     2004-328927 A    11/2004
JP     2006-238565 A     9/2006
(Continued)

OTHER PUBLICATIONS

U.S. Appl. No. 14/362,766, filed Jun. 4, 2014, Matsushita et al.

Primary Examiner — A. Dexter Tugbang
Assistant Examiner — Kaying Kue
(74) Attorney, Agent, or Firm — Foley & Lardner LLP

(57) ABSTRACT

A device for manufacturing a field pole magnet body includes a reference jig having reference surfaces in a lengthwise direction, a width direction, and a thickness direction for positioning the plurality of cleaved and divided magnet fragments; a lengthwise direction pressing means that presses the magnet fragments from the lengthwise
(Continued)

direction to the lengthwise direction reference surface; a width direction pressing means that presses them from the width direction to the width direction reference surface; and a thickness pressing means that presses them from the thickness direction to the thickness direction reference surface. The lengthwise direction pressing means is operated to press the magnet fragments in a state in which a pressing force of at least one of the width direction pressing means and the thickness direction pressing means is suppressed to be weaker than a pressing force generated by the lengthwise direction pressing means or is released.

8 Claims, 12 Drawing Sheets

(58) Field of Classification Search
CPC . H02K 1/27; Y10T 29/49075; Y10T 29/5313; B32B 18/00
See application file for complete search history.

(56) References Cited

U.S. PATENT DOCUMENTS

| | | | | |
|---|---|---|---|---|
| 6,274,959 | B1* | 8/2001 | Uchiyama | H02K 49/10 310/152 |
| 7,468,112 | B2* | 12/2008 | Sato | B32B 18/00 156/154 |
| 8,747,583 | B2* | 6/2014 | Takaichi | H01F 41/0253 156/580 |
| 9,251,951 | B2* | 2/2016 | Takaichi | H02K 15/03 |
| 9,330,840 | B2* | 5/2016 | Takaichi | H02K 15/03 |
| 9,613,749 | B2* | 4/2017 | Matsushita | H02K 15/03 |
| 2002/0059718 | A1* | 5/2002 | Watanabe | G11B 17/038 29/603.03 |
| 2003/0159272 | A1* | 8/2003 | Fujita | H02K 1/16 29/596 |
| 2008/0245472 | A1* | 10/2008 | Hirata | B32B 38/1833 156/264 |
| 2009/0126187 | A1* | 5/2009 | Kajiyama | B23Q 1/035 29/760 |
| 2012/0104064 | A1* | 5/2012 | Nishikuma | B26F 3/002 225/1 |
| 2013/0057374 | A1 | 3/2013 | Adachi | |
| 2013/0239378 | A1* | 9/2013 | Kuroiwa | B23P 15/04 29/23.51 |
| 2014/0013582 | A1* | 1/2014 | Fubuki | B26F 3/002 29/598 |
| 2014/0144337 | A1* | 5/2014 | Koike | B28D 1/222 100/35 |
| 2015/0158197 | A1* | 6/2015 | Takaichi | H02K 15/03 225/3 |
| 2015/0270060 | A1* | 9/2015 | Shibukawa | H01F 41/0253 225/23 |
| 2016/0070181 | A1* | 3/2016 | Frissen | G03F 7/70758 355/72 |
| 2016/0111944 | A1* | 4/2016 | Ohshima | H02K 15/03 29/598 |

FOREIGN PATENT DOCUMENTS

| | | |
|---|---|---|
| JP | 2009-033958 A | 2/2009 |
| JP | 2010-154749 A | 7/2010 |
| JP | 2010-252514 A | 11/2010 |
| JP | 2011-244613 A | 12/2011 |

* cited by examiner

MANUFACTURING DEVICE FOR FIELD POLE MAGNET BODY AND MANUFACTURING METHOD FOR SAME

TECHNICAL FIELD

The present invention relates to a manufacturing device for a field pole magnet body to be installed in a rotating electric machine, as well as a manufacturing method for the same.

BACKGROUND ART

As a conventional field pole magnet body to be installed in an embedded permanent magnet-type rotating electric machine, there has been a field pole magnet body formed by cleaving and dividing a magnet body that is rectangular in a plan view (hereinafter referred to simply as a "magnet body") into a plurality of magnet fragments and then adhering the plurality of magnet fragments to each other. In this way, by forming the field pole magnet body with a plurality of magnet fragments and reducing the volume of each magnet fragment, current surges that occur due to fluctuations in the acting magnetic field are reduced. Thereby, heat generation of the field pole magnet body that accompanies current surges is suppressed, and thus irreversible thermal demagnetization is prevented (refer to JP2009-33958A).

In JP2009-33958A, the cleaved surfaces of the magnet fragments that have been cleaved are abutted facing each other and the cleaved surfaces are adhered to each other with an adhesive to integrate them into a field pole magnet body, and this can be easily inserted into a rotor or the like and magnetized.

SUMMARY OF INVENTION

In the case that the cleaved surfaces of the magnet fragments that have been cleaved are adhered to each other via an adhesive, for example, the flat surfaces and side surfaces of each magnet fragment are abutted against a reference jig. Subsequently, a method is carried out in which the magnet fragments are aligned and positioned by pressing them against the jig from the flat surfaces and side surfaces by pressing means and then pressurized from the lengthwise direction of alignment for adhesion.

However, if the pressing forces from a thickness direction and a width direction are too strong, the friction between the magnet fragments and the jig as well as the pressing means increases and thus the pressing force from the lengthwise direction cannot be sufficiently transmitted to the magnet fragments. As a result, there have been problems in that the adhesive force between the magnet fragments may become unstable.

The present invention was created in consideration of the above-described problems, and an object thereof is to provide a manufacturing device for a field pole magnet body that is suited to stabilizing the adhesive force between magnet fragments as well as a manufacturing method for the same.

The manufacturing device for a field pole magnet body according to one embodiment Embodiments of the present invention and advantages of the present invention will be explained in detail below together with the attached drawings.

DESCRIPTION OF EMBODIMENTS

The manufacturing device for a field pole magnet body and the manufacturing method for the same will now be explained below based on embodiments.

First, a field pole magnet body to be installed in a rotating electric machine to which the present invention is applied will be explained.

Figure 1:
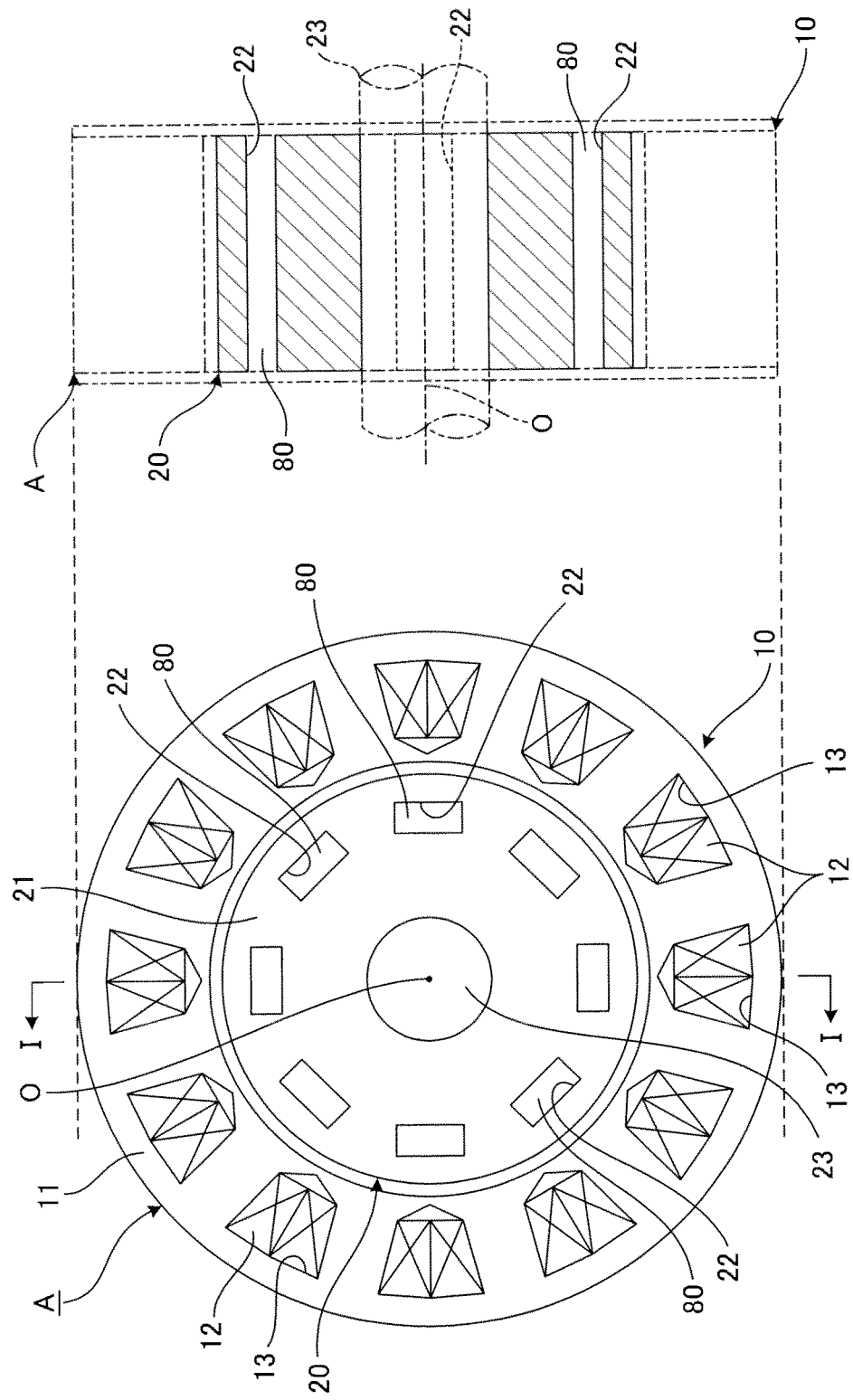
FIG. 1 is a view illustrating a schematic constitution of a rotating electric machine to which a magnet body manufactured by a manufacturing device for a field pole magnet body according to one embodiment is applied.

FIG. 1 is a schematic constitutional view illustrating the constitution of the essential parts of an embedded permanent magnet-type rotating electric machine to which a magnet body manufactured by the manufacturing device for a field pole magnet body according to the present embodiment is applied. In FIG. 1, the drawing on the left side is a cross-section view of the permanent magnet-type electric motor, and the drawing on the right side is a side view. An embedded permanent magnet-type rotating electric machine A (hereinafter referred to simply as "rotating electric machine") includes an annular stator 10 that constitutes a portion of a casing (not illustrated) and a cylindrical rotor 20 that is arranged coaxially with the stator 10.

The stator 10 includes a stator core 11 and a plurality of coils 12. The plurality of coils 12 are accommodated in slots 13 formed in the stator core 11 at intervals of equal angles on the same circumference centered on an axial center O.

The rotor 20 includes a rotor core 21, a rotating shaft 23 that rotates integrally with the rotor core 21, and a plurality of field pole magnet bodies 80. The plurality of field pole magnet bodies 80 are accommodated in slots 22 formed at intervals of equal angles on the same circumference centered on the axial center O.

Figure 2:
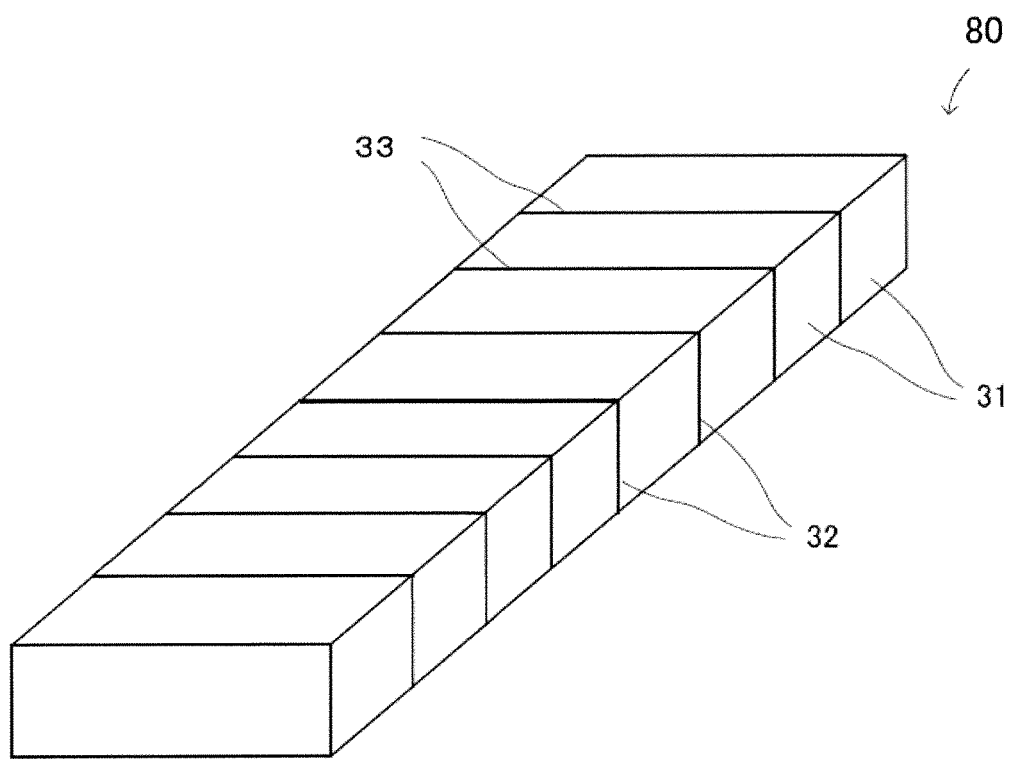
FIG. 2 is a perspective view of a field pole magnet body.

The field pole magnet bodies 80 accommodated in the slots 22 of the rotor 20 are each constituted as an aggregate of a plurality of magnet fragments 31 divided by cleaving in a width direction a magnet body 30 that is rectangular in a thickness direction plan view as shown in FIG. 2. More specifically, each field pole magnet body 80 is constituted as an aggregate of the magnet fragments 31 aligned in a row by adhering the cleaved surfaces of the plurality of magnet fragments 31 to each other with a resin 32. The resin 32 to be used exhibits heat resistance of, for example, approximately 200° C., and for example, an epoxy thermosetting adhesive or the like is used. Glass beads or insulating cloth that functions as a spacer is blended into the adhesive to secure a clearance between the magnet fragments 31 and electrically insulate adjacent magnet fragments 31 from each other. Thereby, current surges that occur due to fluctuations in the acting magnetic field are reduced by keeping them within the individual magnet fragments 31. Therefore, heat generation of the field pole magnet bodies 80 that accompanies current surges is suppressed, and thus irreversible thermal demagnetization is prevented.

In order to cleave a magnet body 30 into a plurality of magnet fragments 31, it is effective to form notch grooves 33 in advance at the areas at which the magnet body 30 is to be cleaved. The magnet body 30 in which the notch grooves 33 are formed will now be explained below, but the notch grooves 33 are not essential to the present invention. In other words, if the magnet body 30 can be cleaved without providing the notch grooves 33, then the notch grooves 33 do not have to be provided on the magnet body 30. The flatness of the cleaved surfaces when the magnet body 30 is cleaved into the magnet fragments 31 is enhanced the deeper from the surface the notch grooves 33 are formed or the sharper the tips at the end of the notch grooves 33 are formed.

As a method for forming the notch grooves 33, mention may be made of providing them in the course of molding the magnet body 30 by protruding stripes for groove formation provided in the die of the magnet body 30, providing them by mechanical processing such as a dicer or a slicer, providing them by laser beam irradiation, providing them by wire-cut electrical discharge machining, and the like.

Figure 3:
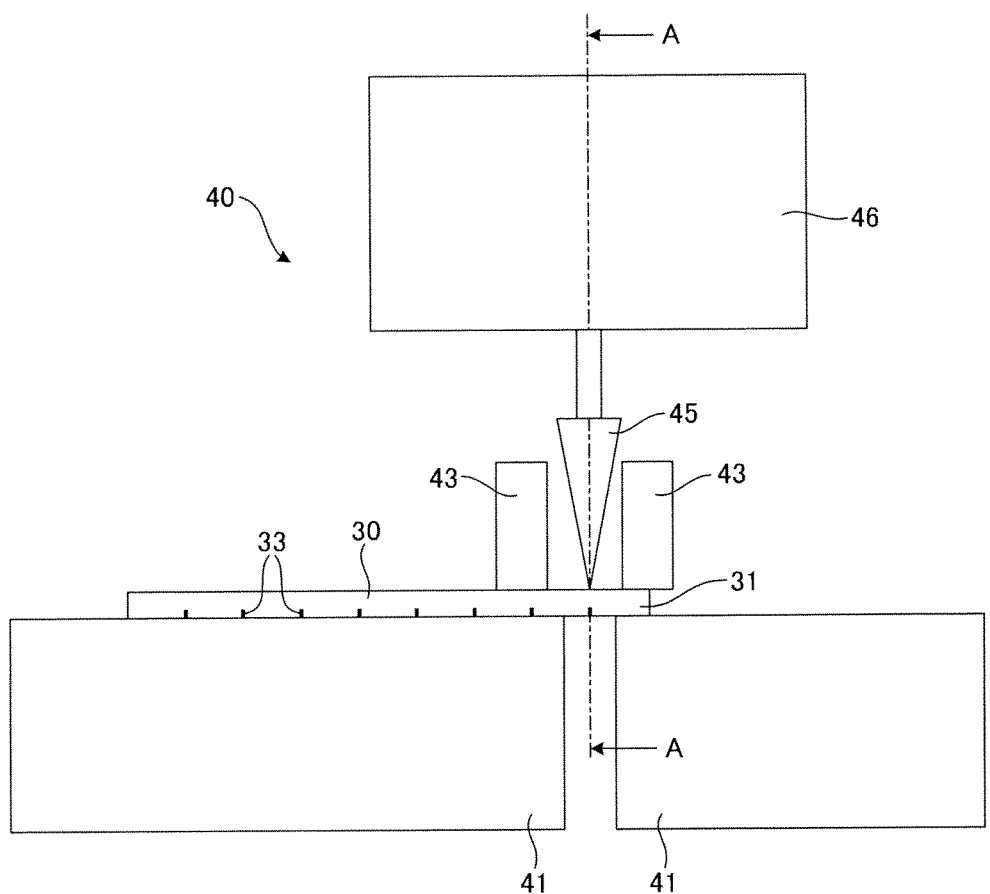
FIG. 3 is a schematic view illustrating a constitution of a magnet dividing jig for cleaving a magnet body.

FIG. 3 is one example of a magnet body cleaving device 40 for cleaving and dividing the magnet body 30 into a plurality of the magnet fragments 31. The magnet body 30 is fixed between a pair of dies 41 such that it is suspended between them, a punch 45 is dropped from above onto the portion that is suspended, and the magnet body 30 is cleaved by three-point bending. The magnet body cleaving device 40 includes a pair of dies 41 serving as a lower tool on which the magnet body 30 is mounted so as to be suspended between the dies 41, and magnet fixing jigs 43 that fix the magnet body 30 at the adjacent ends of the pair of dies 41. The magnet body cleaving device 40 also includes a punch 45 provided on an upper tool 46 that cleaves the magnet body 30 by pressing the suspended portion of the magnet body 30.

The magnet fixing jigs 43 fix the magnet body 30 by pressing it toward the edges of the pair of dies 41, and they press the magnet body 30 by fastening with bolts or by hydraulic or air pressure. The punch 45 cleaves the magnet body 30 along the notch grooves 33 of the magnet body 30 by pressing the portion of the magnet body 30 that is suspended between the pair of dies 41 downwards. The punch 45 is driven by, for example, a servo press, a mechanical press, a hydraulic press, or the like.

The magnet body cleaving device 40 has the above-described constitution, and the magnet body 30 provided with the grooves 33 is mounted so that it is suspended across the top surfaces of the pair of dies 41. The magnet body 30 is mounted on the pair of dies 41 such that the desired positions to be cleaved, or in other words the notch grooves 33 that were provided in advance on the surface to be cleaved are positioned on the side that faces the dies 41. The magnet body 30 is fixed by the magnet fixing jigs 43 in a state in which a notch groove 33 on the surface to be cleaved is positioned using, for example, a servo mechanism such that it is at the center of the suspended portion. The magnet body 30 is then broken and divided along the notch groove 33 by dropping the punch 45. Next, the fixation by the magnet fixing jigs 43 is released, and the magnet body 30 is conveyed by the length of one magnet fragment 31 (the distance between adjacent notch grooves 33). By repeating the above-described operation, the magnet body 30 is cleaved and divided into the plurality of magnet fragments 31.

As a method for adhering and integrating the plurality of cleaved magnet fragments 31 using a resin, mention may be made of, for example, a method in which the flat surfaces and side surfaces of each magnet fragment 31 are abutted against a reference jig, aligned and positioned by pressing with pressing means from the flat surfaces and the side surfaces, and then pressurized for adhesion from the lengthwise direction of alignment. However, if the pressing forces from a thickness direction and a width direction are too strong, the friction between the magnet fragments and the jig as well as the pressing means increases and thus the pressing force from the lengthwise direction cannot be sufficiently transmitted to the magnet fragments. As a result, there have been problems in that the bonding force between the cleaved surfaces of the magnet fragments may become unstable and thus the adhesive force between the magnet fragments 31 may become weak.

Thus, the present embodiment provides a manufacturing device and a manufacturing method for a field pole magnet body that includes an integrating device that integrates the magnet fragments 31 by increasing a bonding force between the cleaved surfaces of the cleaved magnet fragments 31 when pressing them from the three directions of the thickness direction, the width direction, and the lengthwise direction (alignment direction) of the magnet fragments 31 when bonding the magnet fragments 31 to each other with an adhesive.

Figure 4:
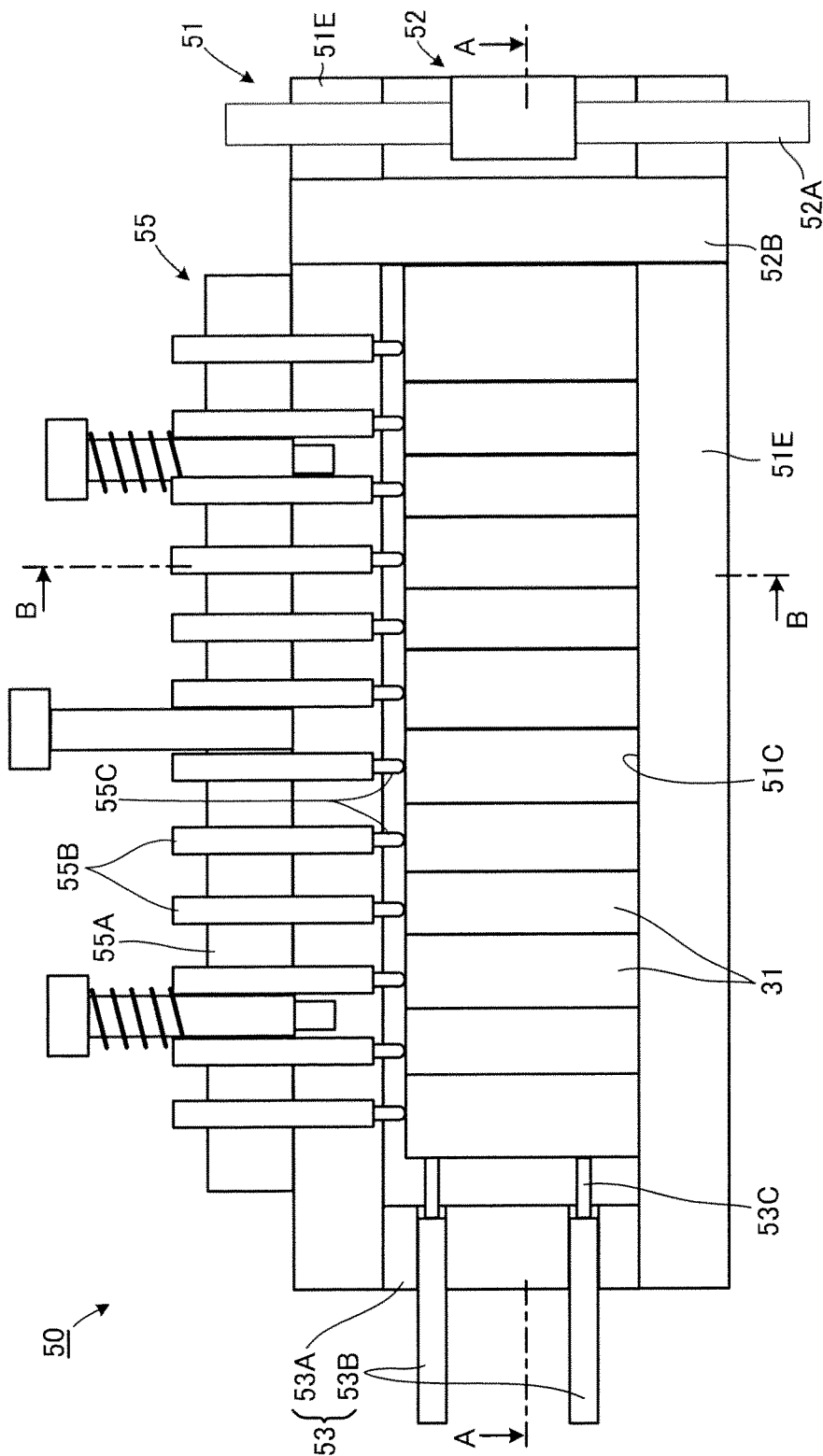
FIG. 4 is a plan view illustrating a constitution of an integrating device of a first embodiment.
Figure 5:
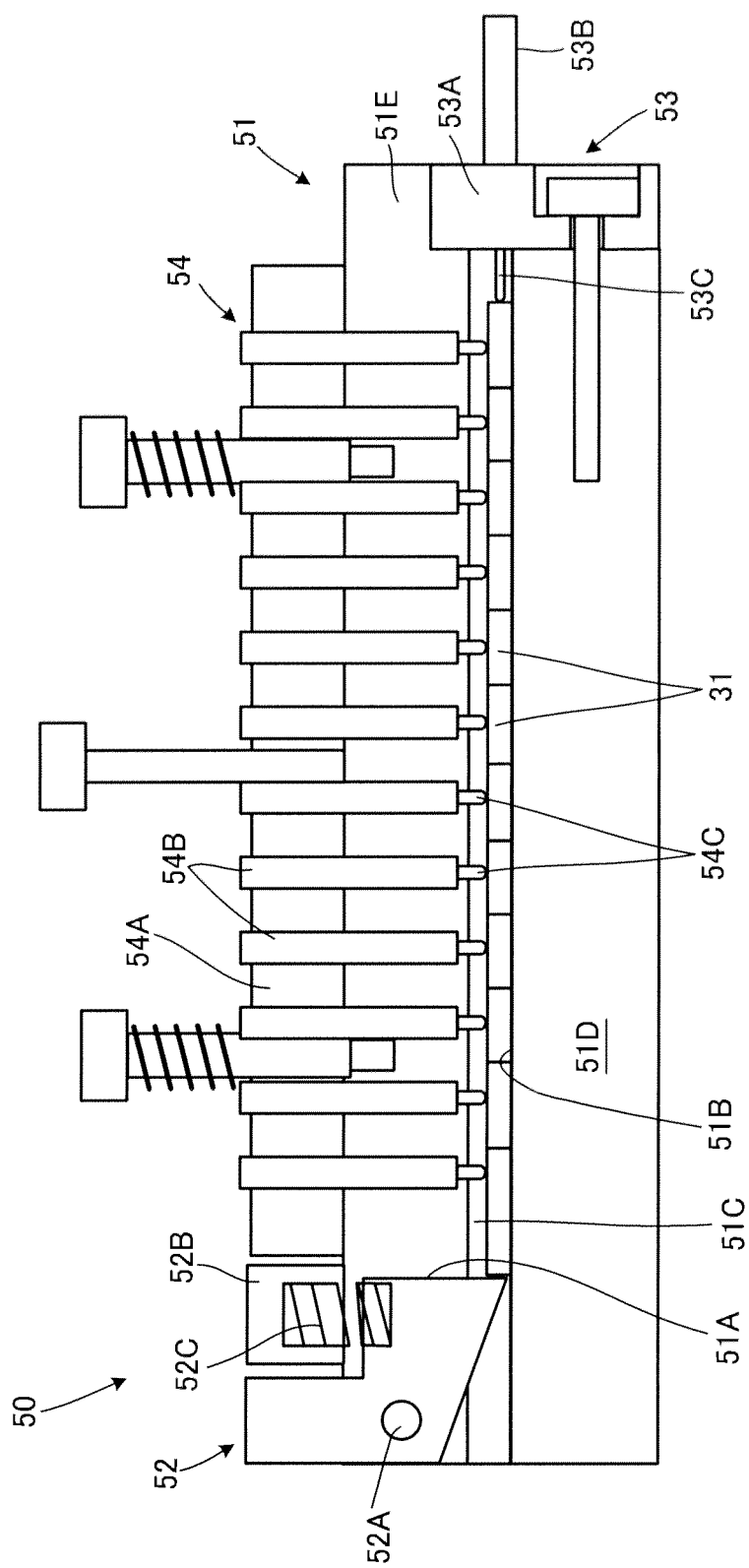
FIG. 5 is a cross-section view along line A-A of the integrating device shown in FIG. 4.
Figure 6:
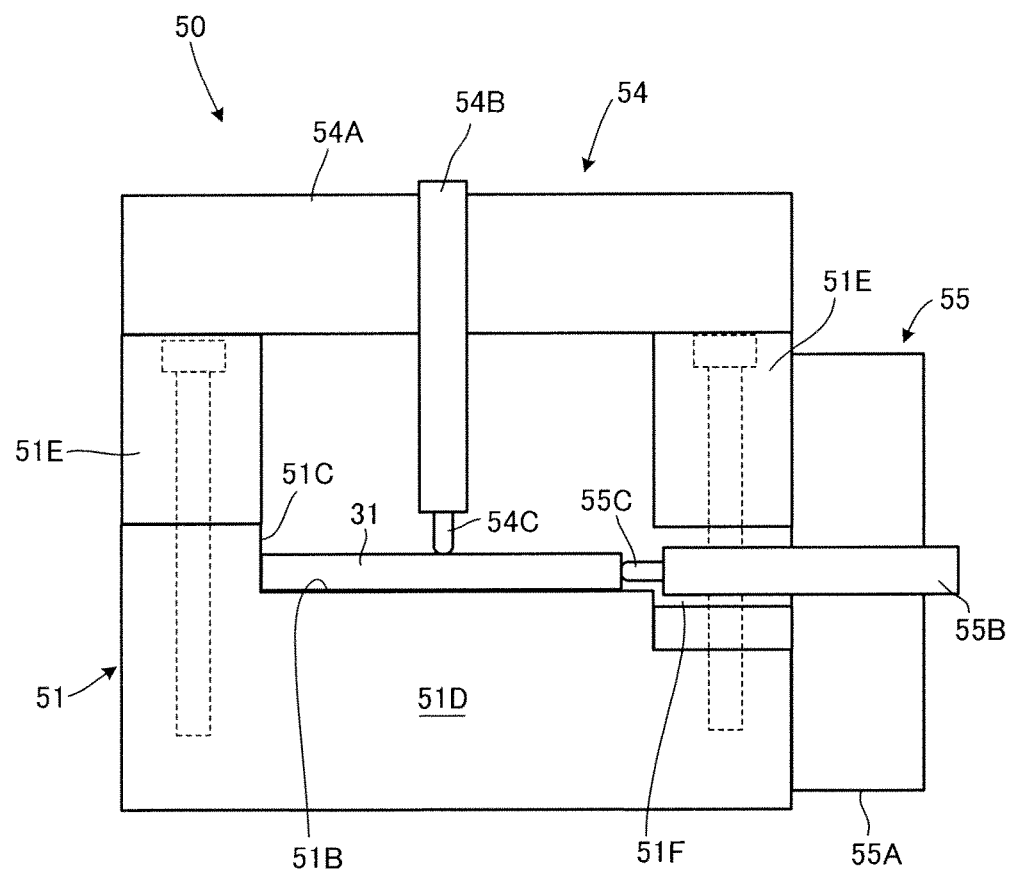
FIG. 6 is a cross-section view along line B-B of the integrating device shown in FIG. 4.

FIGS. 4 to 6 are respectively a front view, a side view, and a cross-section view illustrating the constitution of an integrating device 50 of the first embodiment that aligns and integrates the plurality of cleaved magnet fragments 31. The integrating device 50 includes a reference jig 51 that supports the plurality of magnet fragments 31 in the thickness direction and the width direction, and a pivoting pawl 52 including a lengthwise direction reference surface 51A that supports the magnet fragments 31 from the lengthwise direction. The integrating device 50 also includes a lengthwise direction pressing means 53 that presses the plurality of magnet fragments 31 toward the lengthwise direction reference surface 51A of the reference jig 51. The integrating device 50 further includes a thickness direction pressing means 54 that presses the plurality of magnet fragments 31 from the thickness direction to a thickness direction reference surface 51B of the reference jig 51, and a width direction pressing means 55 that presses the plurality of magnets 31 to a width direction reference surface 51C of the reference jig 51.

The reference jig 51 has a base side and two lateral sides, and is formed with a gutter-shaped cross-section in which the top surface is completely opened. The reference jig 51 is constituted by a main body 51D that has an L-shaped cross-section and forms the bottom side, and lateral side members 51E that are fixed on the top surface at both sides in the width direction of the main body 51D and form the two lateral sides. The thickness direction reference surface 51B that abuts one of the surfaces in the thickness direction of each of the plurality of magnet fragments 31 that are positioned and supported therein and the width direction reference surface 51C that protrudes from one side of the thickness direction reference surface 51B and abuts one of the surfaces in the width direction of each of the plurality of magnet fragments 31 are integrally formed in the main body 51D.

The pivoting pawl 52 is pivotably supported by a pin 52A which is supported at both ends on two lateral side members 51E, and the lengthwise direction reference surface 51A is formed by an inner wall surface of the pivoting pawl 52 within the reference jig 51. In the pivoting pawl 52, a portion supported by the pin 52A and a distal end pawl are offset in the lengthwise direction of the reference jig 51, and the distal end pawl is biased so that it contacts the thickness direction reference surface 51B by a spring 52C whose base is supported on a bridging member 52B that is fixed at both ends on the two lateral side members 51E. Therefore, in a state in which the distal end pawl is in contact with the thickness direction reference surface 51B, the magnet fragments 31 are positioned and supported from the lengthwise direction by the lengthwise direction reference surface 51A that is formed by a wall surface of the pivoting pawl 52 within the reference jig 51. If the distal end pawl is pivoted counter to the spring 52C so that it separates from the thickness direction reference surface 51B, a gap is formed between the tip of the pawl and the thickness direction reference surface 51B. The magnet fragments 31 can be pushed into the reference jig 51 through this gap.

The lengthwise direction pressing means 53 is arranged to oppose the lengthwise direction reference surface 51A at the other end in the lengthwise direction of the reference jig 51. The lengthwise direction pressing means 53 includes an attachment panel 53A that is fixed by a screw or the like to an end in the lengthwise direction of the reference jig 51 and a plurality of pressing cylinders 53B that are arranged and fixed so as to penetrate through the attachment panel 53A. The constitution of the pressing cylinders 53B will be explained later. A distal end of a piston rod 53C that protrudes from each pressing cylinder 53B is arranged so as to abut an end in the lengthwise direction of the magnet fragments 31 arranged within the reference jig 51, and is configured to press the magnet fragments 31 toward the lengthwise direction reference surface 51A.

The thickness direction pressing means 54 is arranged to oppose the thickness direction reference surface 51B of the reference jig 51, and includes an attachment panel 54A that is fixed by a screw or the like to an opening that is opened in a gutter-shaped fashion of the reference jig 51 and a plurality of pressing cylinders 54B that are arranged and fixed so as to penetrate through the attachment panel 54A. The number of pressing cylinders 54B is configured to correspond to the number of magnet fragments 31 that are arranged within the reference jig 51. A tip of a piston rod 54C that protrudes from each pressing cylinder 548 is arranged so as to abut the thickness direction surface of each magnet fragment 31 arranged within the reference jig 51, and is configured to press the magnet fragment 31 toward the thickness direction reference surface 51B. The concrete constitution of the pressing cylinders 54B will be explained later.

The width direction pressing means 55 is arranged to oppose the width direction reference surface 51C of the reference jig 51, and includes an attachment panel 55A that is fixed by a screw or the like to a lateral side opposing the width direction reference surface 51C and a plurality of pressing cylinders 55B that are arranged and fixed so as to penetrate through the attachment panel 55A. The number of pressing cylinders 55B is configured to correspond to the number of magnet fragments 31 that are arranged within the reference jig 51. Each pressing cylinder 55B is arranged so as to penetrate through a through hole 51F provided on the lateral side member 51E. A tip of a piston rod 55C that protrudes from each pressing cylinder 55B is arranged so as to abut the width direction surface of each magnet fragment 31 arranged within the reference jig 51, and is configured to press the magnet fragment 31 toward the width direction reference surface 51C. The concrete constitution of the pressing cylinders 55B will be explained later.

Figure 7:
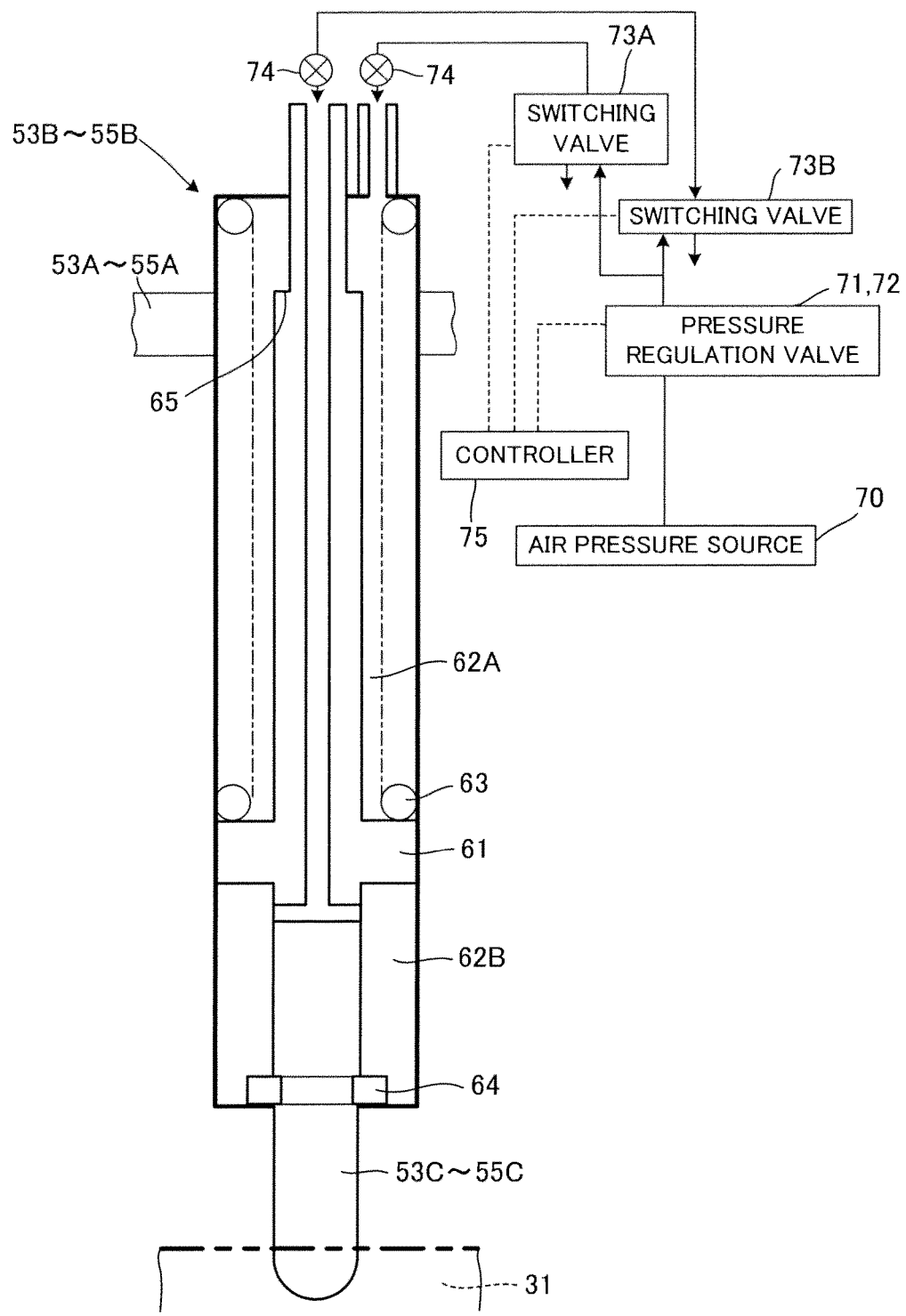
FIG. 7 is a schematic cross-section view of a pressing cylinder that constitutes pressing means for a thickness direction/width direction and a lengthwise direction.

As shown in FIG. 7, each pressing cylinder 53B-55B is formed by, for example, an air actuator. A compression spring 63 is built into a cylinder chamber 62A that is divided by a piston 61 of the actuator, and the piston rod 53C-55C is biased to be pushed out forward (downward direction in the drawing) via the piston 61 that slides within the cylinder. As illustrated in FIG. 7, in a state in which a magnet fragment 31 does not exist at the tip of the piston rod 53C-55C, the piston rod 53C-55C is pushed out until it is stopped by a stopper 64. Air pressure and atmospheric pressure that is regulated by a pressure regulation valve 71 can be selectively supplied from an air pressure source 70 via switching valves 73A and 73B to the cylinder chambers 62A and 62B that are divided by the piston 61. The pressure regulation value of the pressure regulation valve 71 and the switching operation of the switching valves 73A and 73B are controlled by a controller 75. The pipings between the switching valves 73A and 73B and the actuator are connected via connectors 74. By removing the connectors 74, the integrating device 50 can be independently transported, and can be transported by a transport apparatus to a heating furnace.

Figure 8:
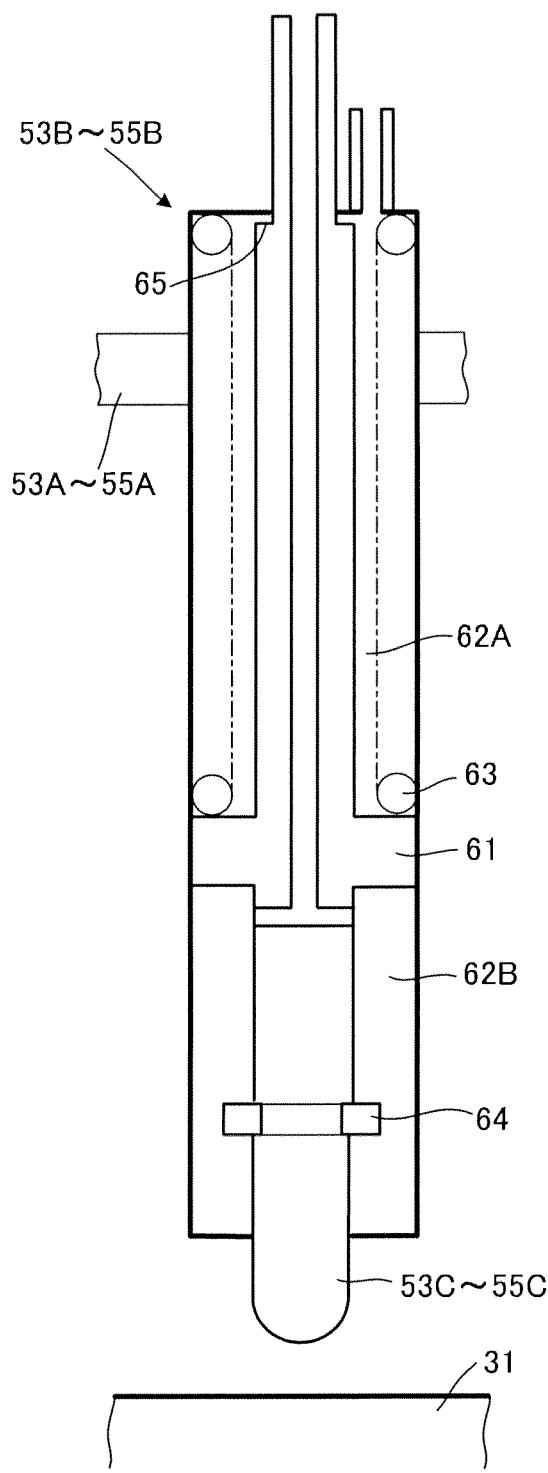
FIG. 8 is a cross-section view illustrating a contracted state of the pressing cylinder.
Figure 9:
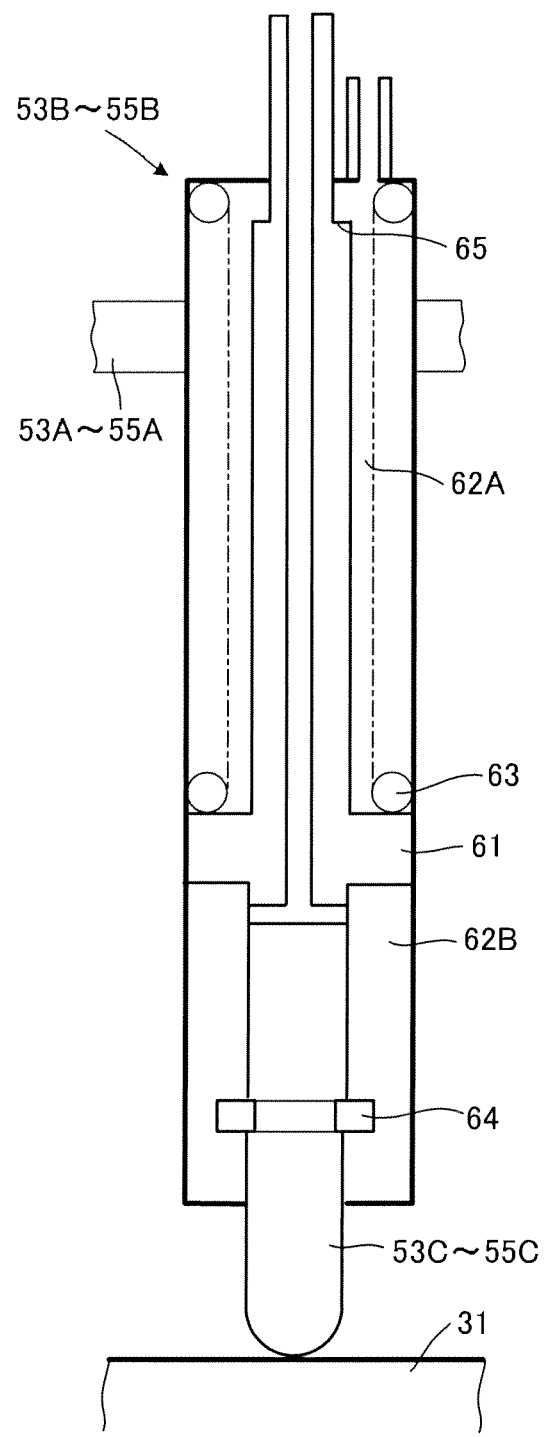
FIG. 9 is a cross-section view illustrating an operating state of the pressing cylinder.

Therefore, when air pressure is supplied via the switching valve 73B to a cylinder chamber 62B, the piston 61 is retracted counter to the compression spring 63 as shown in FIG. 8 so that the piston rod 53C-55C can be retracted until it is stopped by a stopper step 65. Further, if a magnet fragment 31 is arranged at the tip of the piston rod 53C-55C and air pressure is discharged from the cylinder chamber 62B, the piston rod 53C-55C in its retracted state is pushed out by the spring 63 so that its tip abuts the magnet fragment 31 as shown in FIG. 9. Therein, the piston rod 53C-55C can press the magnet fragment 31 by the biasing force of the spring 63. At this time, if air pressure at a pressure that counterbalances the biasing force of the spring 63 is supplied into the cylinder chamber 62B, the pressing force against the magnet fragment 31 can be released to zero in a state in which the tip of the piston rod 53C-55C abuts the magnet fragment 31. Further, if pressure-regulated air pressure is supplied to the cylinder chamber 62A, a biasing force by the air pressure is added to the pressing force by the spring 63 so that the magnet fragment 31 can be pressed.

Figure 10:
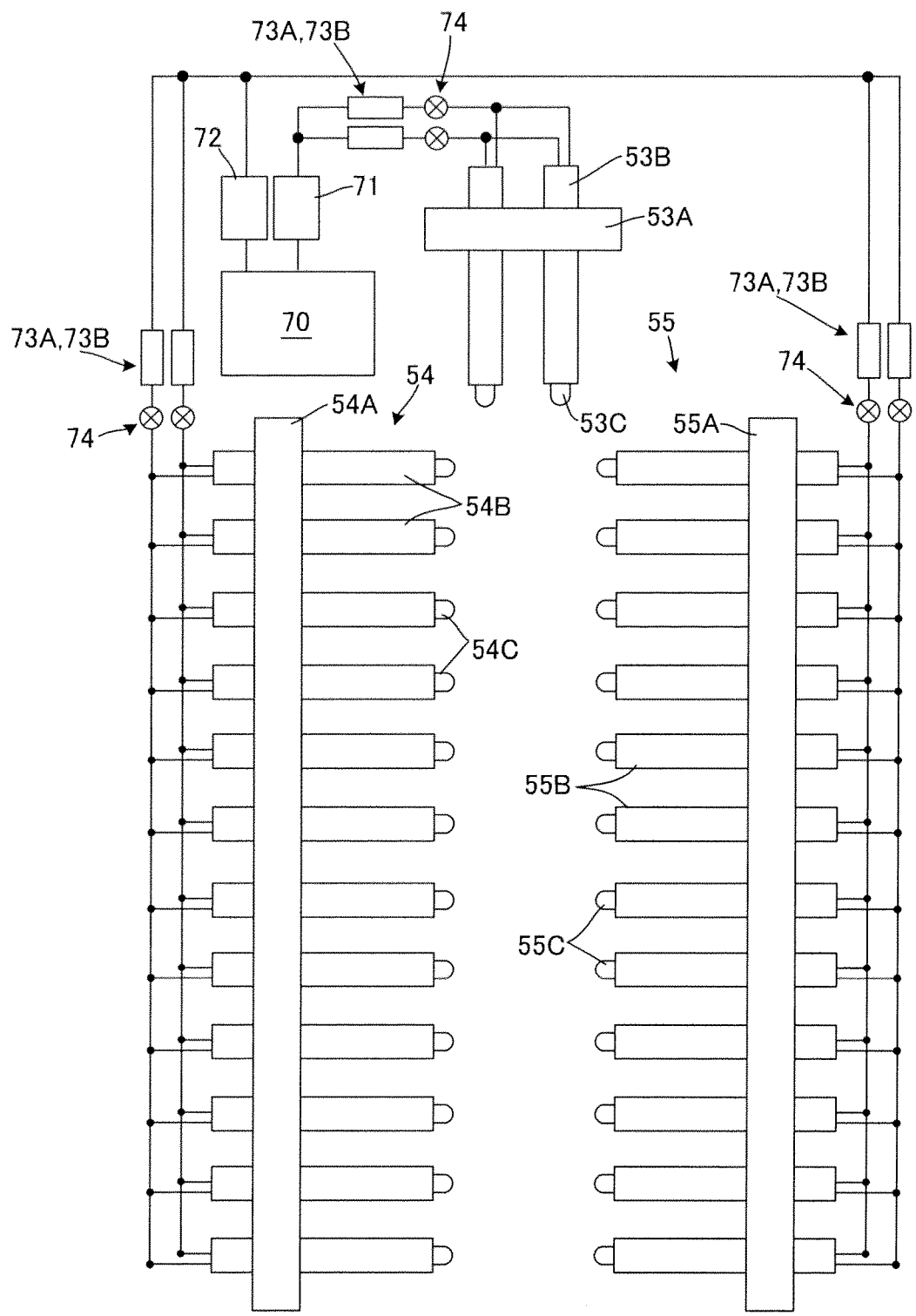
FIG. 10 is an explanatory view illustrating air pressure piping to each pressing cylinder.

FIG. 10 illustrates air pressure piping to the lengthwise direction pressing cylinders 53A, the thickness direction pressing cylinders 53B, and the width direction pressing cylinders 53C. As shown in FIG. 10, common piping for the lengthwise direction pressing cylinders 53A, the thickness direction pressing cylinders 53B, and the width direction pressing cylinders 53C is connected to the switching valves 73A and 73B via the connectors 74. Pressure-regulated air pressure is supplied from the air pressure source 70 via the pressure regulation valve 71 to the switching valves 73A and 73B connected to the lengthwise direction pressing cylinders 53A. Also, pressure-regulated air pressure is supplied from the air pressure source 70 via a pressure regulation valve 72 to the switching valves 73A and 73B connected to the thickness direction pressing cylinders 53B and width direction pressing cylinders 53C. As described above, the switching position and pressure regulation value of the switching valves 73A and 73B and the pressure regulation valves 71 and 72 are controlled by the input of switching signals and pressure regulation signals from the controller 75.

Figure 11:
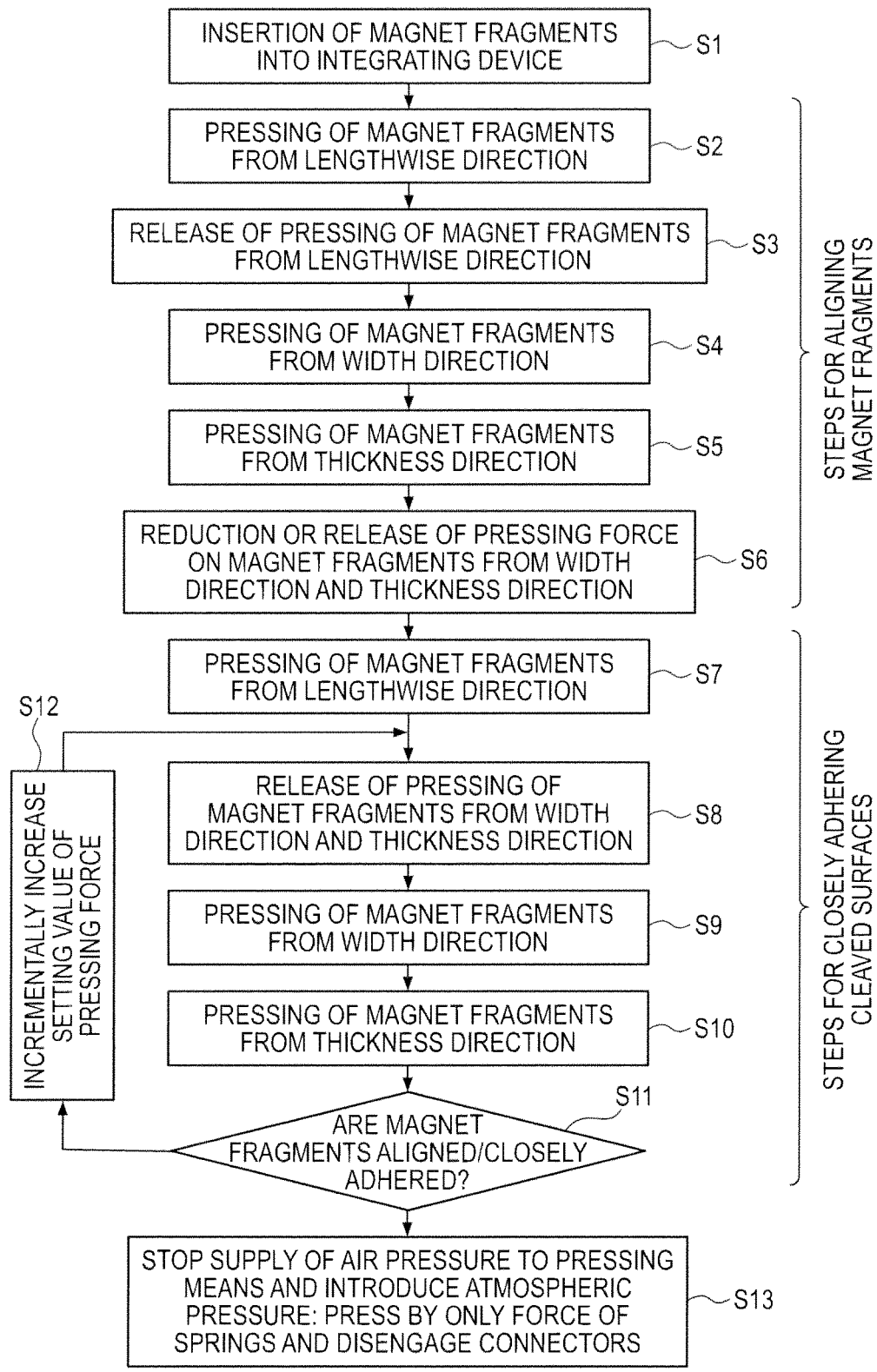
FIG. 11 is flowchart illustrating a procedure for integrating magnet fragments in the integrating device.

Next, the method for aligning and integrating the plurality of cleaved magnet fragments 31 with the device 50 for integrating the field pole magnet body constituted as described above will now be explained below along with FIG. 11 which illustrates the procedure thereof.

First, air pressure is supplied to the cylinder chamber 62B of each pressing cylinder 53B-55B of the lengthwise direction pressing means 53, thickness direction pressing means 54, and width direction pressing means 55 of the integrating device 50 of FIGS. 4 to 6 so as to retract each piston rod 53C-55C of each pressing cylinder 53B-55B. Next, the magnet fragments 31, which have been cleaved and an adhesive has been applied to the cleaved surfaces thereof, are aligned in the order in which they were cleaved along the width direction reference surface 51C and the thickness direction reference surface 51B from the outside in the lengthwise direction of the integrating device 50, and then pushed into the integrating device 50 from the outside of the distal end of the pivoting pawl 52 that includes the lengthwise direction reference surface 51A. The distal end of the pivoting pawl 52 that includes the lengthwise direction reference surface 51A is abutted to the thickness direction reference surface 51B of the integrating device 50 by the spring 52C. Therefore, the pivoting pawl 52 pivots counter to the spring 52C due to the magnet fragments 31 being pushed in so as to disengage the pawl distal end from the thickness direction reference surface 51B, and thereby a gap is formed between the pawl distal end and the thickness direction reference surface 51B. The magnet fragments 31 can then be inserted into the integrating device 50 through the gap between the pawl distal end and the thickness direction reference surface 51B.

When a final magnet fragment 31 of a predetermined number is inserted into the integrating device 50 by a pushing rod or the like (not illustrated), once the lengthwise direction surface at the rear of the final magnet fragment 31 passes the distal end of the pivoting pawl 52, the pivoting pawl 52 pivots by the spring 52C so that its distal end abuts the thickness direction reference surface 51B (step S1). In this state, the lengthwise direction surface at the forward side of the foremost magnet fragment 31 abuts or faces the tip of the piston rod 53C of the pressing cylinder 53B of the lengthwise direction pressing means 53. The lengthwise direction surface at the rear of the final magnet fragment 31 passes the distal end of the pivoting pawl 52 so that a pre-set interval opens between it and the lengthwise direction reference surface 51A of the pivoting pawl 52.

Next, each piston rod 53C is pushed out by the spring 63 by releasing the air pressure within the cylinder chamber 62B of each pressing cylinder 53B of the lengthwise direction pressing means 53. The tip of each piston rod 53C abuts the lengthwise direction surface of the magnet fragment 31 at the end to press/move the magnet fragments 31 arranged in the lengthwise direction toward the lengthwise direction reference surface 51A in order to position the magnet fragments 31 at a predetermined position in the lengthwise direction within the reference jig 51. The magnet fragments 31 are aligned with their cleaved surfaces contacting each other by the biasing force of the springs 63 that are built into the lengthwise direction pressing means 53 (step S2). Instead of generating the pressing force by the lengthwise direction pressing means 53 with only the biasing force by the springs 63 as described above, air pressure can be introduced into the cylinder chambers 62A to generate the pressing force by the springs 63 as well as this air pressure.

Next, if air pressure was being introduced into the cylinder chamber 62A of each pressing cylinder 53B, then this introduction of air pressure is blocked by the switching valve 73A and the inside of each cylinder chamber 62A is opened to the atmosphere. Each piston rod 53C is then retracted counter to the spring 63 by supplying air pressure into the cylinder chamber 62B of each pressing cylinder 53B of the lengthwise direction pressing means 53, and thereby the pressing force in the lengthwise direction on the magnet fragments 31 is reduced to zero. In this case, as described above, the tip of the piston rods 53C are separated from the magnet fragment 31 positioned at the end such that the pressing force in the lengthwise direction on the magnet fragments 31 is zero. However, the pressing force on the magnet fragments 31 can also be reduced to zero in a state in which the contact state between the tips of the piston rods 53C and the magnet fragment 31 positioned at the end is maintained by modifying the air pressure supplied to the cylinder chambers 62B with the pressure regulation valve 71 to a pressure equivalent to the pressing force of the springs 63. Thereby, the pressing force in the lengthwise direction on the magnet fragments 31 is released, and when the magnet fragments 31 are moved in the width direction and thickness direction under a load in the width direction and thickness direction to be explained later, a state is reached in which movement in the lengthwise direction of the magnet fragments 31 due to irregularities between the cleaved surfaces that contact each other is allowed (step S3).

Next, air pressure within the cylinder chamber 62B of each pressing cylinder 55B of the width direction pressing means 55 is released, and air pressure is supplied into each cylinder chamber 62A to push out the piston rod 55C. The tip of each piston rod 55C contacts the width direction surface of each magnet fragment 31 and presses each magnet fragment 31 to the width direction reference surface 51C to position each magnet fragment 31 in the width direction (step S4). During this positioning, the cleaved surfaces of the magnet fragments 31 which have irregularities are contacted to each other, but the application of a pressing force by the lengthwise direction pressing means 53 has been released. Therefore, movement of the magnet fragments 31 in the lengthwise direction is permitted, and the width direction position of each magnet fragment 31 is modified corresponding to the biasing force of the springs 63 of the width direction pressing means 55 and a positional correction in the width direction by air pressure. Instead of generating the pressing force by the width direction pressing means 55 with only the biasing force by the springs 63 as described above, air pressure can be introduced into the cylinder chambers 62A to generate the pressing force by the springs 63 as well as this air pressure.

Next, air pressure within the cylinder chamber 62B of each pressing cylinder 54B of the thickness direction pressing means 54 is released, and air pressure is supplied into each cylinder chamber 62A to push out the piston rod 54C. The tip of each piston rod 54C contacts the thickness direction surface of each magnet fragment 31 and presses each magnet fragment 31 to the thickness direction reference surface 51B to position each magnet fragment 31 in the thickness direction (step S5). During this positioning, the cleaved surfaces of the magnet fragments 31 which have irregularities are contacted to each other, but the application of a pressing force by the lengthwise direction pressing means 53 has been released. Therefore, movement of the magnet fragments 31 in the lengthwise direction is permitted, and the thickness direction position of each magnet fragment 31 is modified corresponding to the biasing force of the springs 63 of the thickness direction pressing means 54 and a positional correction in the thickness direction by air pressure. Instead of generating the pressing force by the thickness direction pressing means 54 with only the biasing force by the springs 63 as described above, air pressure can be introduced into the cylinder chambers 62A to generate the pressing force by the springs 63 as well as this air pressure.

In the above, the magnet fragments 31 which have been arranged are pressed toward the width direction reference surface 51C by the width direction pressing means 55 and then pressed toward the thickness direction reference surface 51B by the thickness direction pressing means 54. However, the pressing order is not limited to the above-described order. For example, the magnet fragments 31 can be pressed toward the width direction reference surface 51C by the width direction pressing means 55 after pressing them toward the thickness direction reference surface 51B by the thickness direction pressing means 54.

Next, if air pressure is being introduced into the cylinder chambers 62A of the pressing cylinders 54B and 55B of the thickness direction and width direction pressing means 54 and 55 to generate a pressing force by this air pressure and the springs 63, the pressing force is reduced. In other words, the pressing force is reduced by introducing atmospheric pressure into the cylinder chambers 62A of the pressing cylinders 54B and 55B of either one or both of the width direction pressing means 55 and the thickness direction pressing means 54 (step S6). Further, if the width direction pressing means 55 and the thickness direction pressing means 54 are generating a pressing force by only the springs 63, this state is maintained. Alternatively, the pressing force by the springs 63 can be further weakened by introducing a low air pressure into the cylinder chambers 62B of the pressing cylinders 54B and 55B of the width direction pressing means 55 and the thickness direction pressing means 54.

Next, air pressure within the cylinder chamber 62B of each pressing cylinder 53B of the lengthwise direction pressing means 53 is released, and air pressure is supplied into each cylinder chamber 62A to push out the piston rod 53C by a pressing force generated by the spring 63 and air pressure (step S7). The tip of each piston rod 53C contacts the lengthwise direction surface of each magnet fragment 31 and presses the magnet fragments 31 which have been positionally corrected in the width direction and thickness direction and arranged in the lengthwise direction to the lengthwise direction reference surface 51A. The magnet fragments 31 generate a frictional force between the width direction and thickness direction reference surfaces 51C and 51B and the tips of the piston rods 54C and 55C due to the pressing by the width direction pressing means 55 and the thickness direction pressing means 54, and thus frictional resistance is generated against the movement in the lengthwise direction by the pressing force generated by the lengthwise direction pressing means 53. Therefore, the pressing force generated by the lengthwise direction pressing means 53 is set to a numerical value (air pressure value) that overcomes the frictional resistance generated between the width direction and thickness direction reference surfaces 51C and 51B and the tips of the piston rods 54C and 55C to move the magnet fragments 31 in the lengthwise direction. The magnet fragments 31 are moved by this pressing in the lengthwise direction counter to the frictional resistance generated by the width direction pressing means 55 and the thickness direction pressing means 54, and are pressed towards the lengthwise direction reference surface 51A of the reference jig 51 with their adjacent cleaved surfaces contacting each other so as to closely adhere the cleaved surfaces to each other in the lengthwise direction.

During the pressing by the lengthwise direction pressing means 53, the pressing force of at least one of the width direction pressing means 55 an the thickness direction pressing means 54 is generated by only the springs 63, or the pressing forces of both of the width direction pressing means 55 an the thickness direction pressing means 54 are generated by only the springs 63. Alternatively, the pressing force by the springs 63 is further weakened by introducing a low air pressure into the cylinder chambers 62B of the pressing cylinders 54B and 55B of the width direction pressing means 55 and the thickness direction pressing means 54. In any of these cases, the frictional resistance generated between the width direction and thickness direction reference surfaces 51C and 51B and the tips of the piston rods 54C and 55C during the pressing by the lengthwise direction pressing means 53 is sufficiently reduced. Therefore, the pressing force by the lengthwise direction pressing means 53 is transmitted to the magnet fragments 31 overcoming the frictional resistance generated between the width direction and thickness direction reference surfaces 51C and 51B and the tips of the piston rods 54C and 55C, and thus the cleaved surfaces of the magnet fragments 31 can be closely adhered to each other in the lengthwise direction.

Figure 12:
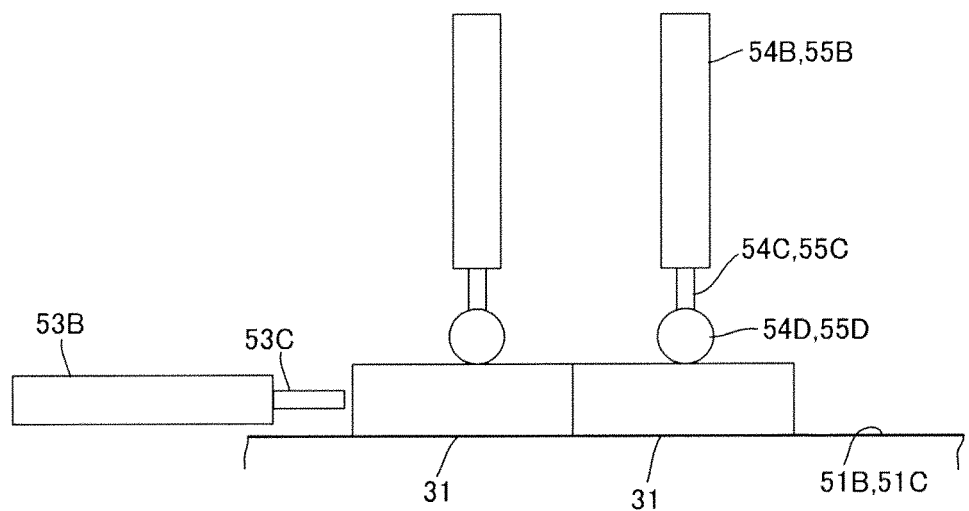
FIG. 12 is an explanatory view illustrating a concrete example of width direction and thickness direction pressing means.

As shown in FIG. 12, in order to reduce the frictional resistance generated by the width direction pressing means 55 and the thickness direction pressing means 54, rollers 54D and 55D (rolling balls are also possible) that rollingly contact the surface of the magnet fragments 31 can be provided on the tips of the piston rods 54C and 55C of the pressing means 54 and 55. In this case, during the pressing by the lengthwise direction pressing means 53, a pressing force in a state that overcomes the frictional resistance generated between the width direction and thickness direction reference surfaces 51C and 51B and the tips of the piston rods 54C and 55C can be reduced.

Next, if air pressure is being supplied into the cylinder chambers 62A of the thickness direction and width direction pressing means 54 and 55, this air pressure is released and air pressure is supplied into the cylinder chambers 62B to release the pressing forces in the width direction and thickness direction (step S8). Thereby, the frictional force generated between the magnet fragments 31 and the thickness direction and width direction reference surfaces 51B and 51C as well as the tips of the piston rods 54C and 55C is reduced, and thus the contact pressure between the cleaved surfaces of the magnet fragments 31 can be increased by the lengthwise direction load applied by the lengthwise direction pressing means 53.

Next, air pressure is released from within the cylinder chambers 62B of the thickness direction and width direction pressing means 54 and 55, and then air pressure is supplied into the cylinder chambers 62A to increase the pressing forces in the width direction and thickness direction (steps S9 and S10). Thereby, the magnet fragments 31 are strongly pressed toward the thickness direction and width direction reference surfaces 51B and 51C so as to forcefully align them.

It is then determined whether a gap exists between the width direction and thickness direction surfaces of the magnet fragments 31 and the reference surfaces 51B and 51C of the reference jig 51 (step S11). At this time, if a gap exists between the width direction and thickness direction surfaces of one of the magnet fragments 31 and the reference surfaces 51B and 51C of the reference jig 51, then the setting values of the pressing forces by the width direction pressing means 55 and the thickness direction pressing means 54 are incrementally increased in step S12. Steps S8 to S10 are then executed again to strongly press the magnet fragments 31 toward the thickness direction and width direction reference surfaces 51B and 51C so as to forcefully align them. Steps S8 to S10 and S12 are repeatedly executed until all of the magnet fragments 31 reach a state in which no gaps exist between the width direction and thickness direction surfaces and the reference surfaces 51B and 51C of the reference jig 51. Further, in the determination of step S11, if no gaps exist between the width direction and thickness direction surfaces of any of the magnet fragments 31 and the reference surfaces 51B and 51C of the reference jig 51, the procedure moves to step S13.

Thereby, the cleaved surfaces of the cleaved magnet fragments 31 which face each other in a state in which an adhesive is interposed therebetween contact each other in a state in which they are pressed by the springs 63 of the lengthwise direction pressing means 53. The adhesive that is interposed between the cleaved surfaces spreads out appropriately between the cleaved surfaces due to the above-mentioned pressing force, and thus the adhesive force can be ensured. Further, the magnet fragments 31 are aligned with each other in the thickness direction and the width direction, and are bonded to each other with the adhesive interposed therebetween in a state in which irregularities between the cleaved surfaces are matched up to each other. Therefore, the adhesive is arranged between the magnet fragments 31 such that the thickness of the adhesive is the same in every region of the cleaved surfaces.

Next, the supply of air pressure to the pressing means 53 to 55 is stopped and atmospheric pressure is introduced into the cylinder chambers 62A and 62B to press the magnet fragments 31 by only the force of the springs 63 of the pressing means 53 to 55. The magnet fragments 31 are maintained in a state in which they are positioned in the width direction and the thickness direction by the biasing force generated by the springs 63 of the thickness direction pressing means 54 and the width direction pressing means 55.

Next, the connectors 74 of the air pressing piping to the lengthwise direction, thickness direction, and width direction pressing means 53 to 55 are removed, so that the integrating device 50 in which the plurality of magnet fragments 31 are positioned and retained can be transported (step S13). The integrating device 50 in which the plurality of magnet fragments 31 are positioned and retained is then transported to a heating furnace and passed through the heating furnace to raise the temperature to, for example, 150° C. in order to cure the adhesive.

Dimensional changes in the lamination direction of the magnet fragments 31 occur due to thermal expansion during curing of the adhesive by raising the temperature and decreases in the viscosity of the adhesive caused by raising the temperature. However, since the thickness direction and width direction pressing means 54 and 55 press the magnet fragments 31 with a pre-set pressing force by the springs 63 so as to allow movement in the lengthwise direction of the magnet fragments 31, they track the movement due to the deformation of the springs 63 that press and support the piston rods 53C of the lengthwise direction pressing means 53. Therefore, decreases in the adhesive force between the magnet fragments 31 can be suppressed, and a uniform adhesive force between the magnet fragments 31 can be achieved. As a result, the clearance between the magnet fragments 31 can be uniformly controlled without breaking the spacers blended into the adhesive, and the overall length dimension of the field pole magnet body 80 can be contained within a desired dimension (standard).

Subsequently, the lengthwise direction, thickness direction, and width direction pressing means 53 to 55 are removed from the reference jig 51 and the integrated magnet body 30 is extracted from the reference jig 51, and thereby the field pole magnet body 80 can be formed.

If the grooves 33 provided in advance for cleaving the magnet body 30 are created by laser processing, protrusions in the thickness direction are formed along the cleaved surfaces of the magnet fragments 31. In a laser beam irradiation method, the tip at the end of each notch groove 33 can be sharpened, and the equipment used therein and the running costs are inexpensive. However, in such a laser beam irradiation method, the material that constitutes the volume of each groove 33 formed on the magnet surface, or in other words the material in a region that is melted as each notch groove 33 is displaced to both sides of the notch groove 33 and accumulates and adheres thereto. Thus, burrs (protrusions) are ultimately formed on the magnet surface on both sides of the notch groove 33 by the material that has accumulated and adhered.

In the thickness direction pressing means 54 of the present embodiment, the magnet fragments 31 are pressed at the center of the thickness direction surface of each magnet fragment 31 toward the thickness direction reference surface 51B of the reference jig 51 by the tips of the piston rods 54C of the pressing cylinders 54B. Therefore, the magnet fragments 31 can be pressed while avoiding any burrs formed on the surface of the magnet fragments 31 at both sides of each notch groove 33. Thus, the magnet fragments 31 can be aligned without any deviations in the thickness direction between the magnet fragments 31 and the thickness direction reference surface 51B of the reference jig 51. Further, expansion and the like that occurs during spreading of the adhesive and curing of the adhesive as well as lengthwise direction movement of the magnet fragments 31 when the magnet fragments 31 are pressed from the lengthwise direction by the lengthwise direction pressing means 53 can be permitted without any interference from such protrusions.

Protrusions on the surface of the field pole magnet body 80 are removed all at once by mechanical processing after curing of the adhesive. In this way, removing any protrusions after the magnet fragments 31 have been integrated into the field pole magnet body 80 enables easy improvement of the shaping precision of the field pole magnet body 80 compared to a case in which protrusions are removed from each individual magnet body 31 to adjust its shape before integration. Further, this also enables a large field pole magnet body 80 to be produced, and as a result it contributes to improving the motor output.

As described above, by pressing the cleaved and divided magnet fragments 31 from the three directions of the thickness direction, the width direction, and the lengthwise direction with the integrating device 50, the magnet fragments 31 can be integrated with the adhesive to form the field pole magnet body 80 in a state in which any deviations between the cleaved magnet fragments 31 have been suppressed. Therefore, when assembling the field pole magnet bodies 80 into the slots 22 of the rotor core 21, a defect in which the magnet fragments 31 that constitute the field pole magnet body 80 catch onto the edges of the slot 22 of the rotor core 21 such that the field pole magnet body 80 cannot be assembled is prevented. In other words, deviations between the magnet fragments 31 can be suppressed, and thus the defect rate of defective articles that occur when the field pole magnet body 80 cannot be inserted into the slot 22 of the rotor core 21 due to deviations between the magnet fragments 31 can be improved, which in turn leads to improvements in the yield.

In addition, the magnet dimensions of the field pole magnet body 80 can be formed to be the same size as the inner dimensions of the slot 22 of the rotor core 21, and thus a large field pole magnet body 80 can be produced compared to a case in which a field pole magnet body 80 having deviations between the magnet fragments 31 is inserted. Thereby, the motor output can be improved.

Also, in the above-described embodiment, as a method for arranging the magnet fragments 31 in the integrating device 50, the magnet fragments 31 are inserted upon pivoting the pivoting pawl 52 that constitutes the lengthwise direction reference surface 51A from behind the pivoting pawl 52. However, the method for arranging the magnet fragments 31 is not limited to that described above. For example, it is also possible to form the lengthwise direction reference surface 51A with a simple wall surface, and then when inserting the magnet fragments 31, the thickness direction pressing means 54 is removed from the reference jig 51 and the plurality of magnet fragments 31 are inserted and arranged in the reference jig 51 from the opening that is opened. In this case, the thickness direction pressing means 54 is subsequently reattached to the reference jig 51, and then the pressing means 53 to 55 are operated in the same order as described above to integrate the plurality of magnet fragments 31.

Further, in the above-described embodiment, pressing means that extended and contracted the piston rods 53C to 55C by the springs 63 and air pressure were used as the lengthwise direction, thickness direction, and width direction pressing means 53 to 55. However, the pressing means are not limited to such a constitution. For example, it is also possible to constitute the pressing means by providing a rod that freely extends/contracts from the cylinder, connecting a spring at the base of the rod, enabling the base position of the spring to be moved in the cylinder axial direction by a screw, and then adjusting the tightening position of the screw by a servo motor or the like. In this method, the rod can be retracted by loosening the screw to retract the base position of the spring, and the rod can be advanced by tightening the screw to move the base position of the spring forward. Moreover, by further tightening the screw in a state in which the tip of the rod abuts the magnet fragment 31, the pressing force on the magnet fragment 31 can also be adjusted.

In the present embodiment, the following effects are achieved.

(A) The manufacturing device for a field pole magnet body 80 to be installed in a rotating electric machine A manufactures the field pole magnet body 80 by aligning a plurality of magnet fragments 31 formed by cleaving and dividing a magnet body 30 in the width direction and then bonding the magnet fragments 31 to each other. To do so, the manufacturing device for the field pole magnet body 80 has a reference jig 51 that includes lengthwise direction, thickness direction, and width direction reference surfaces 51A to 51C for positioning the plurality of cleaved and divided magnet fragments 31 in an aligned state with their cleaved surfaces facing each other. In addition, the manufacturing device for the field pole magnet body 80 includes a lengthwise direction pressing means 53 that presses the plurality of magnet fragments 31 from the lengthwise direction in which they are arranged to the lengthwise direction reference surface 51A in order to align the magnet fragments 31 in the lengthwise direction. The manufacturing device for the field pole magnet body 80 further includes a width pressing means 55 that presses the plurality of magnet fragments 31 from the width direction of the magnet fragments 31 to the width direction reference surface 51C in order to align them in the width direction, and a thickness direction pressing means 54 that presses the plurality of magnet fragments 31 from the thickness direction of the magnet fragments 31 to the thickness direction reference surface 51B in order to align them in the thickness direction. Also, the lengthwise direction pressing means 53 is operated to press the magnet fragments 31 in the lengthwise direction in which they are arranged in a state in which the pressing force of at least one of the width direction pressing means 55 and the thickness direction pressing means 54 on the plurality of magnet fragments 31 arranged within the reference jig 51 is suppressed to be weaker than the pressing force generated by the lengthwise direction pressing means 53 or is released.

In other words, the pressing force of at least one of the width direction pressing means 55 and the thickness direction pressing means 54 is suppressed to be weaker than the pressing force generated by the lengthwise direction pressing means 53 or is released. Therefore, a frictional force generated between the magnet fragments 31 and the reference jig 51 and the thickness direction and width direction pressing means 54 and 55 due to the pressing by the thickness direction and width direction pressing means 54 and 55 can be reduced. Thus, the pressing force by the lengthwise direction pressing means 53 is sufficiently transmitted to the plurality of magnet fragments 31 arranged within the reference jig 51, and the cleaved surfaces of the plurality of magnet fragments 31 can be closely adhered to each other via the adhesive. As a result, the adhesive force between the magnet fragments 31 can be stabilized.

(B) Among the lengthwise direction pressing means 53, the width direction pressing means 55, and the thickness direction pressing means 54, the lengthwise direction pressing means 53 is operated first to press the magnet fragments 31 from the lengthwise direction in which they are arranged. Subsequently, in a state in which the pressing by the lengthwise direction pressing means 53 is maintained, the width direction pressing means 55 and the thickness direction pressing means 54 are operated to press the magnet fragments 31 in the width direction and thickness direction. In other words, if the pressing in the lengthwise direction in which the magnet fragments 31 are arranged is carried out first, a load is not yet applied at this time in the width direction and thickness direction of the magnet fragments 31. Therefore, the load in the lengthwise direction can be sufficiently transmitted to the magnet fragments 31, and as a result, the adhesive force between the magnet fragments 31 can be stabilized.

(C) The pressing operations of the width direction pressing means 55 and the thickness direction pressing means 54 are carried out repeatedly until the magnet fragments 31 are aligned to the thickness direction and width direction reference surfaces 51B and 51C of the reference jig 51. Therefore, deviations in the width direction and thickness direction (deviations in the lamination direction) of the magnet fragments 31 can be sufficiently corrected.

In the above-described embodiments, surfaces that contact the entire edge surface of the magnet fragment were used as reference surfaces in the width direction, thickness direction, and lengthwise direction. However, reference surfaces having, for example, a pin shape that contacts a portion of the edge surface can also be used. Further, the reference surfaces in the width direction, thickness direction, and lengthwise direction do not have to be completely fixed and positioned, and instead they can be configured to press the magnet fragments by moving in the width direction, thickness direction, and lengthwise direction.

The present application claims priority based on Japanese Patent Application No. 2011-273222 filed at the Japan Patent Office on Dec. 14, 2011, the entire contents of which are expressly incorporated herein by reference.

The invention claimed is:

1. A device for manufacturing a field pole magnet body that is configured to be installed in a rotating electric machine and is manufactured by aligning and bonding a plurality of magnet fragments formed by cleaving and dividing a magnet body in a width direction, the device comprising:
   a reference jig having a lengthwise direction reference surface in a lengthwise direction, a width direction reference surface in a width direction, and a thickness direction reference surface in a thickness direction for positioning the plurality of cleaved and divided magnet fragments in an aligned state with their cleaved faces facing each other,
   a lengthwise direction pressing device configured to press the plurality of magnet fragments from the lengthwise direction in which they are arranged to the lengthwise direction reference surface in order to align the magnet fragments in the lengthwise direction,
   a width direction pressing device configured to press the plurality of magnet fragments from the width direction of the magnet fragments to the width direction reference surface to align them in the width direction, and
   a thickness direction pressing device configured to press the plurality of magnet fragments from the thickness direction of the magnet fragments to the thickness direction reference surface to align them in the thickness direction,
   wherein the lengthwise direction pressing device is operated to press the magnet fragments in the lengthwise direction in which they are arranged in a state in which
      a pressing force of at least one of the width direction pressing device and the thickness direction pressing device on the plurality of magnet fragments arranged within the reference jig, is suppressed to be weaker than a pressing force generated by the lengthwise direction pressing device, or
      at least one of the width direction pressing device and the thickness direction pressing device on the plurality of magnet fragments arranged within the reference jig is released.

2. The device for manufacturing a field pole magnet body according to claim 1, wherein among the lengthwise direction pressing device, the width direction pressing device, and the thickness direction pressing device, the lengthwise direction pressing device is operated first to press the magnet fragments from the lengthwise direction in which they are arranged, and
   in a state in which the pressing by the lengthwise direction pressing device is maintained, the width direction pressing device and the thickness direction pressing device are operated to press the magnet fragments in the width direction and thickness direction.

3. The device for manufacturing a field pole magnet body according to claim 2, wherein pressing operations of the width direction pressing device and the thickness direction pressing device are carried out repeatedly until the magnet fragments are aligned to the width direction and thickness direction reference surfaces of the reference jig.

4. A method for manufacturing a field pole magnet body that is to be installed in a rotating electric machine and is produced by aligning and bonding a plurality of magnet fragments formed by cleaving and dividing a magnet body in a width direction, the method comprising:
   arranging the plurality of cleaved and divided magnet fragments within a reference jig with their cleaved surfaces facing each other,
   pressing the plurality of arranged magnet fragments from a lengthwise direction in which they are arranged to a lengthwise direction reference surface to contact the cleaved surfaces of the magnet fragments to each other,
   pressing the plurality of magnet fragments from the width direction of the magnet fragments to a width direction reference surface of the reference jig to align them in the width direction and pressing the plurality of magnet fragments from a thickness direction of the magnet fragments to a thickness direction reference surface of the reference jig to align them in the thickness direction while maintaining the state in which the magnet fragments are pressed from the lengthwise direction, and
   pressing the magnet fragments in the lengthwise direction in which they are arranged in a state in which a pressing force in at least one of the width direction and the thickness direction on the plurality of magnet fragments arranged within the reference jig, is suppressed to be weaker than a pressing force in the lengthwise direction, or
   the pressing force in at least one of the width direction and the thickness direction on the plurality of magnet fragments arranged within the reference jig is released.

5. The method for manufacturing a field pole magnet body according to claim 4, wherein pressing from the width direction and pressing from the thickness direction are carried out repeatedly until the magnet fragments are aligned to the width direction and thickness direction reference surfaces of the reference jig.

6. A device for manufacturing a field pole magnet body that is to be installed in a rotating electric machine and is manufactured by aligning and bonding a plurality of magnet fragments formed by cleaving and dividing a magnet body in a width direction, the device comprising:
   a reference jig having a lengthwise direction reference surface in a lengthwise direction, a width direction reference surface in a width direction, and a thickness direction reference surface in a thickness direction for positioning the plurality of cleaved and divided magnet fragments in an aligned state with their cleaved faces facing each other,
   a lengthwise direction pressing means configured to press the plurality of magnet fragments from the lengthwise direction in which they are arranged to the lengthwise direction reference surface in order to align the magnet fragments in the lengthwise direction,
   a width direction pressing means configured to press the plurality of magnet fragments from the width direction of the magnet fragments to the width direction reference surface to align them in the width direction, and
   a thickness direction pressing means configured to press the plurality of magnet fragments from the thickness direction of the magnet fragments to the thickness direction reference surface to align them in the thickness direction, wherein the lengthwise direction pressing means is operated to press the magnet fragments in the lengthwise direction in which they are arranged in a state in which
a pressing force of at least one of the width direction pressing means and the thickness direction pressing means on the plurality of magnet fragments arranged within the reference jig, is suppressed to be weaker than a pressing force generated by the lengthwise direction pressing means, or at least one of the width direction pressing means and the thickness direction pressing means on the plurality of magnet fragments arranged within the reference jig is released.

7. The device for manufacturing a field pole magnet body according to claim 6, wherein among the lengthwise direction pressing means, the width direction pressing means, and the thickness direction pressing means, the lengthwise direction pressing means is operated first to press the magnet fragments from the lengthwise direction in which they are arranged, and in a state in which the pressing by the lengthwise direction pressing means is maintained, the width direction pressing means and the thickness direction pressing means are operated to press the magnet fragments in the width direction and thickness direction.

8. The device for manufacturing a field pole magnet body according to claim 7, wherein pressing operations of the width direction pressing means and the thickness direction pressing means are carried out repeatedly until the magnet fragments are aligned to the width direction and thickness direction reference surfaces of the reference jig.

* * * * *